United States Patent
Diez Herrera et al.

(10) Patent No.: US 10,689,894 B2
(45) Date of Patent: Jun. 23, 2020

(54) ADJUSTABLE STOPPER ELEMENT WITH IMPROVED FIXATION AND/OR ADJUSTABILITY

(71) Applicant: ILLINOIS TOOL WORKS INC., Glenview, IL (US)

(72) Inventors: Victor Diez Herrera, Barcelona (ES); Ivan Martin Marino, Barcelona (ES); Albert Pares Isanta, Les Franqueses del Valles (ES); Philip Stellwag, Wolfsburg (DE); Marco Spanier, Wolfsburg (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 16/335,942

(22) PCT Filed: Sep. 19, 2017

(86) PCT No.: PCT/US2017/052131
§ 371 (c)(1),
(2) Date: Mar. 22, 2019

(87) PCT Pub. No.: WO2018/063847
PCT Pub. Date: Apr. 5, 2018

(65) Prior Publication Data
US 2019/0309555 A1    Oct. 10, 2019

(30) Foreign Application Priority Data

Sep. 29, 2016  (EP) .................................... 16191379
May 31, 2017  (EP) .................................... 17173617

(51) Int. Cl.
*E05F 5/02*     (2006.01)
*B29C 45/16*    (2006.01)
*B29L 31/30*    (2006.01)

(52) U.S. Cl.
CPC .............. *E05F 5/022* (2013.01); *B29C 45/16* (2013.01); *E05F 5/025* (2013.01);
(Continued)

(58) Field of Classification Search
CPC ..... Y10T 16/61; Y10T 16/625; Y10T 16/628; Y10T 16/6285; E05F 5/00; E05F 5/003;
(Continued)

(56) References Cited

U.S. PATENT DOCUMENTS 5,735,511 A * 4/1998 Stocker .................... E05F 5/022
                                                          248/569
6,088,878 A * 7/2000 Antonucci .............. E05F 5/022
                                                           16/86 A
(Continued)

FOREIGN PATENT DOCUMENTS

DE           29716111 U1 * 11/1997 .............. E05F 5/022
DE          102011101393      11/2012
WO       WO 2015/094457        6/2015

OTHER PUBLICATIONS

PCT, International Search Report and Written Opinion, International Application No. PCT/US2017/052131; dated Nov. 17, 2017, 14 pages.

*Primary Examiner* — Chuck Y Mah
(74) *Attorney, Agent, or Firm* — Thompson Hine LLP

(57) ABSTRACT

An adjustable stopper device (1) for a vehicle door or hood, includes a base part (100), and adjustment part (200), a stopper part (300) and a fastening structure (400). The adjustment part is connected to the base part via threads (120, 220) and thereby rotatable around a device axis (210) with respect to the base part (100). The stopper part is configured to contact the vehicle door and to provide an abutment surface (310) for the vehicle door when the vehicle door is closed, wherein the stopper part is connected to the adjustment part and wherein the axial position of the abut- (Continued)

ment surface is adjustable by turning the adjustment part with respect to the base part around the device axis. The fastening structure fastens the base part to the car body (2). A vehicle with, use of and method for manufacturing such a device are also described.

8 Claims, 12 Drawing Sheets

(52) U.S. Cl.
CPC ....... *B29L 2031/30* (2013.01); *E05Y 2600/10* (2013.01); *E05Y 2600/12* (2013.01); *E05Y 2600/14* (2013.01); *E05Y 2600/32* (2013.01); *E05Y 2600/53* (2013.01); *E05Y 2800/12* (2013.01); *E05Y 2800/46* (2013.01); *E05Y 2800/674* (2013.01); *E05Y 2800/676* (2013.01); *E05Y 2900/531* (2013.01); *E05Y 2900/536* (2013.01)

(58) Field of Classification Search
CPC ... E05F 5/006; E05F 5/02; E05F 5/022; E05F 5/025; E05F 5/06; F16F 1/44; F16F 1/445; F16F 1/3732; F16F 1/3735; B65G 69/001; B60G 2204/4502; B29C 45/16; E05Y 2900/536; B62D 25/12; B62D 25/105; B62D 25/10; E05B 83/24; E05B 83/16; E05B 83/20; E05B 83/14; E05B 83/26; E05B 83/28
See application file for complete search history.

(56) References Cited

U.S. PATENT DOCUMENTS

| | | | |
|---|---|---|---|
| 6,119,306 A | 9/2000 | Antonucci et al. | |
| 7,114,217 B2* | 10/2006 | Matsuzawa | E05F 5/022 16/2.2 |
| 7,356,879 B2* | 4/2008 | Dembowsky | F16B 5/0233 16/82 |
| 8,616,622 B2* | 12/2013 | Davis | B60R 21/34 180/69.2 |
| 9,212,512 B2* | 12/2015 | Nakasone | F16F 1/128 |
| 9,574,386 B2* | 2/2017 | Hillgaertner | E05F 1/105 |
| 9,580,951 B2* | 2/2017 | Duprez | B60J 5/107 |
| 9,963,917 B2* | 5/2018 | Reyes Luna | E05F 5/022 |
| 10,150,355 B2* | 12/2018 | Yon | E05F 5/022 |
| 10,150,444 B1* | 12/2018 | Schwalm | B60R 21/38 |
| 2002/0003993 A1* | 1/2002 | Ichimaru | E05F 5/022 411/325 |
| 2002/0010977 A1* | 1/2002 | Salice | E05F 5/02 16/49 |
| 2004/0025290 A1* | 2/2004 | Novarino | E05F 5/022 16/86 A |
| 2005/0002759 A1* | 1/2005 | Pares Isanta | F16B 21/02 411/45 |
| 2008/0265729 A1* | 10/2008 | Netzer | A47B 95/043 312/330.1 |
| 2011/0252599 A1* | 10/2011 | Kutschat | E05C 17/46 16/82 |

\* cited by examiner

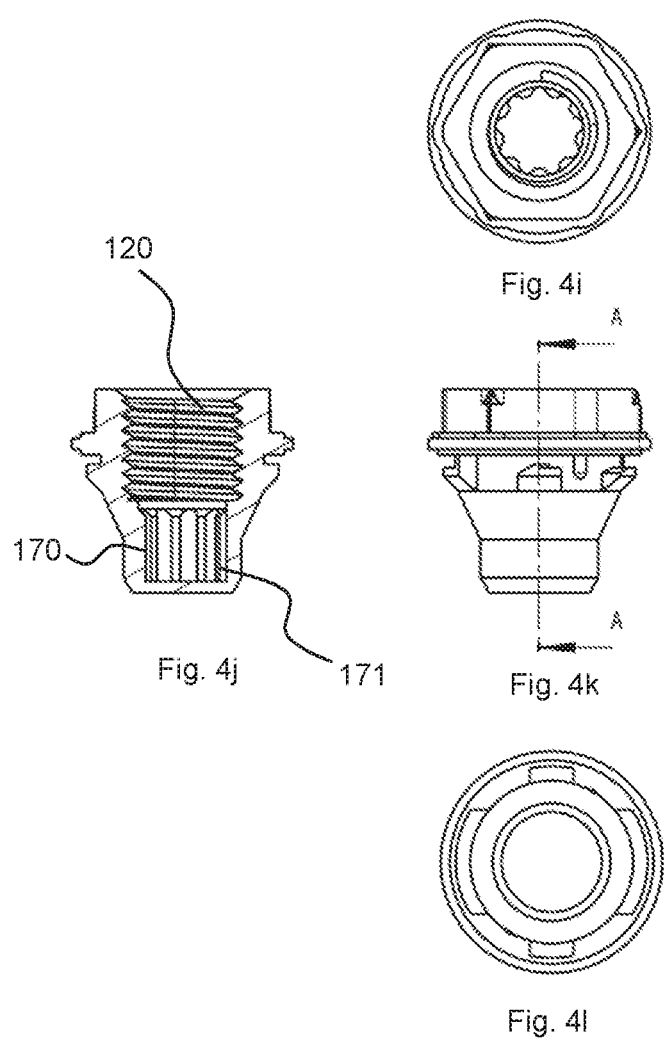

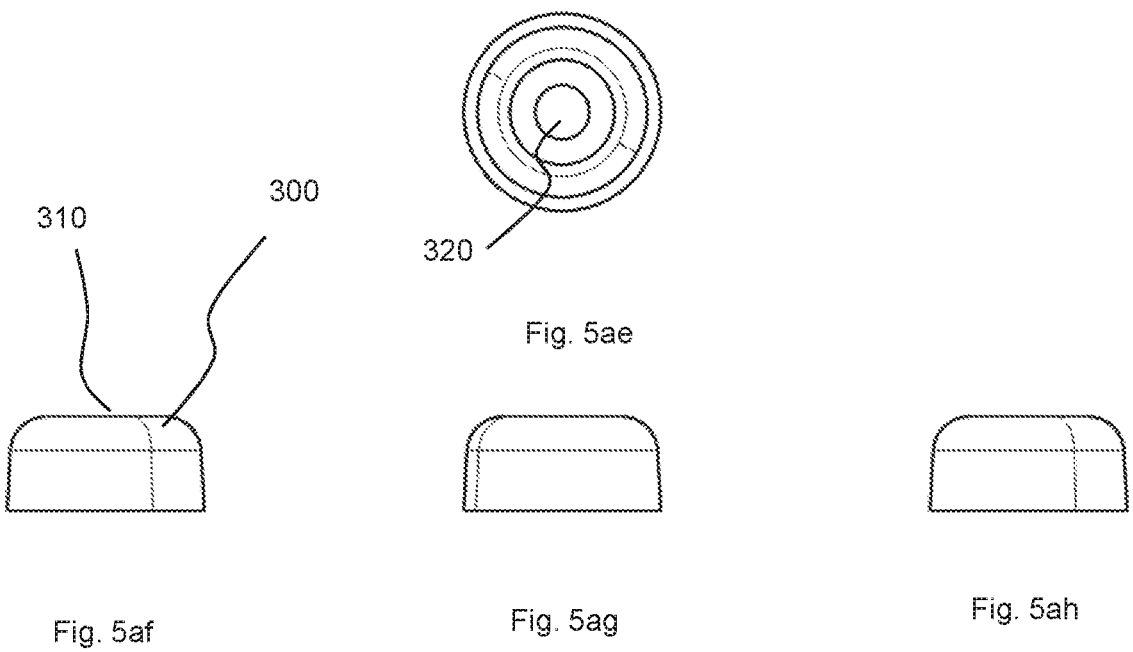
Fig. 5ae
Fig. 5af          Fig. 5ag          Fig. 5ah
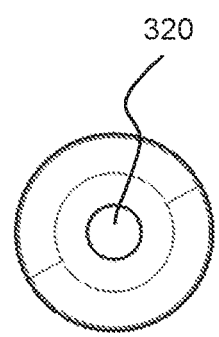
Fig. 5ai

ADJUSTABLE STOPPER ELEMENT WITH IMPROVED FIXATION AND/OR ADJUSTABILITY

TECHNICAL FIELD

This invention relates improvements to adjustable stopper elements.

BACKGROUND

The related art U.S. Pat. No. 6,119,306 shows an automotive deck lid bumper comprising
- a base part,
- an adjustment part, wherein the adjustment part is connected to the base part via threads and thereby rotatable around a device axis with respect to the base part,
- a stopper part configured to contact the vehicle door and to provide an abutment surface for the vehicle door when the vehicle door is closed, wherein the stopper part is connected to the adjustment part and wherein the axial position of the abutment surface is adjustable by turning the adjustment part with respect to the base part around the device axis,
- a fastening structure for fastening the base part to the car body.

The inventors still found such or similar bumper disadvantageous, e.g., with respect to dismountability, sealing properties, disadjustment through unwanted rotation, haptic feedback means for adjustment and/or the way the foregoing are realized.

The object of the invention therefore was to improve such stopper device.

Particularly, this object is achieved by an adjustable stopper device according to the invention.

SUMMARY

Preferably, the stopper part comprises a central opening into which a tool can be inserted for engagement with the adjustment part, in order to rotate the adjustment part.

Preferably, the thread of the base part is an inner thread and the thread of the adjustment part is an outer thread. Preferably, the adjustment part is formed as a pin, which can be screwed into the base part. Preferably, the stopper part is formed as a cap or dome, preferably built of softer material than the adjustment part and/or base part.

Further devices according to the invention are described in the following.

In a further aspect, a second device preferably based on foregoing device, the device comprises a sealing element for sealing against the car body which is surrounding the fastening structure, wherein the sealing element is made of plastic and formed adhesively onto the base part by an injection molding step.

Hereby, no separate assembly/mounting step for a sealing element is necessary.

In a further aspect, a third device preferably based on second device the base part is made of a different plastic and in a different injection molding step than the sealing element, wherein the plastic of the sealing element is softer than the plastic of the base part.

In a further aspect, a fourth device preferably based on one of the preceding devices the fastening structure comprises one or more, preferably two, particularly preferably four, expansion and/or hook elements,
wherein a subset or the entirety of the one or more expansion and/or hook elements is configured to be brought into a fastening position with respect to a corresponding opening or corresponding openings of the car body, wherein, when the subset or the entirety is introduced into the opening or openings and is in the fastening position, the base part is fastened to the car body, and
wherein the subset or the entirety is configured to be brought back, when the base part is fastened to the car body, into a release position with respect to the opening or openings of the car body, wherein with the subset or the entirety being in the release position, the base part can be removed from the car body, preferably pulled out.

Hereby, a screwless fixation can be achieved which is easy to mount, but at the same the possibility of dismounting the device is maintained due to the release position provided.

The expansion and/or hook elements preferably comprise one or more flexible portion, which allows the expansion and/or hook element to move between fastening position and release position.

In a further aspect, a fifth device preferably based on fourth device the device is of the type which is mounted from a substantially different direction than the direction from which the door impinges on the mounted device, such that a central axis of the opening or openings of the car body, which is perpendicular to the surrounding car body surface, and the device axis define a substantial angle between themselves, when the device is mounted to the car body, preferably approximately 90°.

Hereby, a different installation situation, which is from case to case necessary, can be realized.

Substantially different direction or a substantial angle comprises preferably angles equal or greater than 10, preferably 25, particularly preferably 45 degree, and most preferred it is 90°.

In a further aspect, a sixth device preferably based on fourth or fifth device the fastening structure comprises multiple expansion and/or hook elements and the car body comprises one or more openings for one or more of the multiple expansion and/or hook elements, such that, when the device is fastened to the car body the base part is not rotatable with respect to the car body due to a form fitted fastening.

Hereby, unwanted rotation of the base part by door closing forces are avoided.

In a further aspect, a seventh device preferably based on one of fourth to sixth devices the subset or the entirety of the one or more expansion and/or hook elements is made of metal wherein the base part is, preferably mainly or completely, made of plastic.

Hereby strong fastening forces can be achieved while at the same time the device remains light weight.

In a further aspect, an eighth device preferably based on one of fourth to seventh devices a plurality, e.g. two or four, of the expansion and/or hook elements are integrally formed within one or more components, whereby at least two of the expansion and/or hook elements are grouped within one component, wherein the one or more components is or are partly seated and fixed within or attached to the base part.

Hereby, the expansion and/or hook elements are partly crosslinked, which makes them easier to connect to the base part.

In a further aspect, a ninth device preferably based on eighth device the one or more components is or are surrounding the device axis, preferably the threads.

Hereby, the device offers a robust fixation. Surrounding in the case of two components preferably means that the device axis or a projection of the device axis is in between both components.

In a further aspect, a tenth device preferably based on one of fourth to ninth devices the subset or the entirety of the one or more, expansion and/or hook elements are part of one or more clip components which is clipped or clippable onto the base part.

Hereby, the components are anchored reliably within the base part.

In a further aspect, an eleventh device preferably based on tenth device the base part comprises one or more tooth-like protrusions, wherein the one or more clip components are clipped or clippable onto the base part by clipping one or more of the one or more clip components over one or more of the one or more tooth-like protrusions.

In a further aspect, a twelfth device preferably based on eleventh device at least a portion of the one or more clip components covers a side wall of the one or more tooth-like protrusions, preferably a side wall on the far side with respect to the stopper part, such that in the fastened state of the device, said portion of the one or more clip components is located in between the side wall of the one or more tooth-like protrusions and the rim of the opening of the car body such that the one or more clip components protect the tooth-like protrusions from being damaged by the rim of the opening of the car body.

Hereby, the tooth-like portion is not damaged by being cut into by the rim of the opening. It has been found out that especially the side wall of the tooth-like protrusion on the far side with respect to the stopper part is subject to high forces from the rim of the opening when the door/hood impinges on the stopper part.

In a further aspect, a thirteenth device preferably based on one of fourth to twelfth devices the subset or the entirety of the one or more expansion and/or hook elements is or are configured to be brought into the fastening position by at first introducing a side of the device opposite to the subset or the entirety of the one or more expansion and/or hook elements into the corresponding opening or openings until a portion of that side abuts on or next to the rim of the opening and then pivoting the device and/or the base part around that abutted portion, such that by the pivoting, the subset or the entirety of the one or more expansion and/or hook elements reach the fastening position in which they engage behind a rim of the opening or openings.

Hereby, a fastening structure is provided, which allows easy assembly but at the same time secure fastening of the device to the car body.

In a further aspect, a fourteenth device preferably based on one of fourth to thirteenth devices the device, preferably the base part, comprises as one of the expansion and/or hook elements at least one, preferably rigid, hook element at one side which is configured to engage behind the corresponding opening in the car body, and others of the one or more expansion and/or hook elements are located at an opposing side.

Hereby, one side of the device can be solidly locked to the car body via the hook element, while the other side is removably fastened to the car body, which results in an overall very secure fixation of the device to the car body. Preferably, the hook element is integrally formed on the base part out of the same material as the base part.

In a further aspect, a fifteenth device preferably based on fourteenth device the one side is a side neighboring the stopper part, and the opposing side is a far side with respect to the stopper part.

Hereby, a configuration is provided which withstands pull out moments due to closing of the door/hood, as the pull out moment is effective on the hook element, which is safely secured behind the car body opening, while the far side with the expansion and/or hook element is rather pushed to the car body, hence, in inserting direction.

In a further aspect, a sixteenth device preferably based on thirteenth device and one of fourteenth or fifteenth devices the hook element is configured to engage behind the corresponding opening in the car body before or when the one or more expansion and/or hook elements reach the fastening position in which they engage behind a rim of the opening or openings.

Hereby, an easy to mount and securely fastened fixation with the hook element is provided.

In a further aspect, a seventeenth device preferably based on one of fourth to sixteenth devices the subset or the entirety of the one or more expansion and/or hook elements comprise a distal portion having a first inclination with respect to the insertion direction, a proximal portion having second inclination opposite to the first inclination and in between an edge, such that by pulling on the device when its fastened to the car body in a direction opposite to the insertion direction, the subset or the entirety are brought into the release position and further pulling allows to remove the device from the car body.

In a further aspect, an eighteenth device preferably based on seventeenth device the first inclination is lower than the second inclination such that a pull-out force, e.g., min 100N, is higher than an insertion force, e.g., max 45N, of the device.

In a further aspect, a nineteenth device preferably based on seventeenth or eighteenth device the proximal end point of the proximal portion having the second inclination, is either radially fixed with respect to the device or, in the state of the device being mounted, within or before—seen from the insertion side—the opening of the car body.

In a further aspect, a twentieth device preferably based on one of fourth to ninth devices the one or more expansion and/or hook elements is positioned next to a hollow expansion area, and the device comprises one or more bolt elements insertable into the respective expansion area through a bolt opening or bolt openings in the base part, whereby the one or more expansion and/or hook elements are configured to rest in the release position when the bolt element is not inserted into the respective expansion area and are configured to be maintained in the fastening position when the bolt element is inserted in the respective expansion area.

Hereby, an alternative realization of the fastening structure is provided.

In a further aspect, a twenty-first device preferably based on twentieth device the bolt element or the base part comprises a bolt sealing element configured to seal around the bolt element and the bolt opening or openings in the base part.

Hereby, the device can be removed from the car body by pulling on the device.

In a further aspect, a twenty-second device preferably based on twenty-first device the bolt sealing element is formed onto the bolt or onto the base part by a 2-component injection molding process.

Hereby, the reliability of the sealing is enhanced, as the position of the bolt sealing element is exactly predefined.

In a further aspect, a twenty-third device preferably based on one of the preceding devices the device comprises a coupling part, which is coupling the stopper part to the adjustment part, wherein the stopper part is connected, preferably snap fitted, to the coupling part, and the coupling part is connected to the adjustment part, wherein the connection between the adjustment part and the coupling part is formed as a rotational joint, rotating around the device axis.

Hereby, accidental rotation of the stopper part is not transferred to the adjustment part and thereby, an unwanted adjustment of the position of the abutment surface can be avoided.

In a further aspect, a twenty-fourth device preferably based on twenty-third device the connection between the adjustment part and the coupling part, which is formed as the rotational joint, is a snap fit connection between the coupling part and the adjustment part, comprising
- a circular pin having a distal end portion with a bigger diameter than a smaller diameter of a proximal portion, whereby at the proximal portion, the pin is fixed to the adjustment part or to the coupling part, preferably by being integrally formed with the adjustment part or the coupling part;
- and a respective circular opening with a bigger diameter, which is corresponding to the bigger diameter of the pin and located axially further inside the opening, and a smaller diameter, which is corresponding to the smaller diameter of the pin and located axially closer to the rim of the circular opening, whereby the circular opening is formed within the adjustment part, if the pin is fixed to the coupling part, or the circular opening is formed within the coupling part, if the pin is fixed to the adjustment part;

wherein the circular pin and/or the circular opening are resilient to a predetermined extent, whereas preferably the circular pin is squishable, preferably squishable via one or more axial cut outs, and preferably the circular opening is extendable, preferably extendable via one or more axial cut outs.

Hereby the rotational joint can be effectively realized while keeping the number of required parts and mounting efforts minimal.

In a further aspect, a twenty-fifth device preferably based on twenty fourth device the stopper part is made of a softer material than the coupling part.

Hereby, a soft stopper element is used while this is not affecting the rotation between the coupling part and the adjustment element. Preferably, the material of the coupling part and the adjustment element are the same hard material and hence provide a good rotation against each other with comparably low friction.

In a further aspect, a twenty-sixth device preferably based on twenty-fifth device the stopper part and the coupling part comprise two openings, which are axially aligned to each other, preferably coaxially aligned, such that the adjustment element is configured to be rotated by a tool which is introduced into these openings coming from the abutment surface.

Hereby, the device can be adjusted via a tool without having to turn the stopper part.

In a further aspect, a twenty-seventh device preferably based on one of the preceding devices the device comprises a rotation snap mechanism, which snaps into distinct rotational angle positions, which comprises
- a first cylindrical portion in the base part, coaxially positioned with the base part's thread, wherein the inner wall of the first cylindrical portion comprises one or more radially inwards protruding teeth or rips or knobs, and
- a second cylindrical portion of the adjustment part, positioned coaxially with the adjustment part's thread, wherein the outer wall of the second cylindrical portion comprises one or more radially outwards protruding, resilient teeth or rips or knobs which is or are configured to engage with the axially extending teeth or rips or knobs and thereby provide a predefined, resistance to a rotation moment which can be overcome by a predefined threshold moment resulting in a repeated deflection and relaxation of the one or more teeth or rips or knobs of the adjustment part radially inwards and outwards while the adjustment part is being turned around the device axis.

Hereby, the rotation for adjustment can be done in discrete rotation movements whereas the configuration for achieving this (inner toothing on base part, outer protrusion on adjustment part) is specifically space saving. Preferably, the one or more teeth or rips or knobs is(are) resilient by axial cut out(s) of the cylindrical portion. Preferably, the one or more teeth or rips or knobs is(are) rounded or slanted with respect to tangential direction, hence such that a rotation movement is facilitated, while still generating a moment against rotation due to the deflection of some or all of the teeth or rips or knobs. Preferably, the circumscribed circle of the teeth or rips or knobs of the second cylindrical portion is smaller than the circumscribed circle of the thread of the adjustment part. Preferably, the incircle described by the teeth or rips or knobs of the first cylindrical portion is smaller than the incircle described by the thread of the base part. Preferably the threaded portions of base part and adjustment part are distinct and neighboring portions (i.e., axially non overlapping) with respect to the cylindrical portions.

In a further aspect, a twenty-eighth device preferably based on twenty-seventh device the distal end of the first cylindrical portion, which is the end at the far side with respect to the position of the adjustment part and/or stopper part, is
- closed off by the base part's material or
- covered by a sealing cover, formed onto the base part by a two-component injection molding process, preferably within the same injection molding step as the sealing element.

Hereby, no separate assembly part is needed. The application of a two-component injection molding process was made possible because of the specific configuration of the rotation snap mechanism, having inner toothing on base part, outer protrusion on adjustment part, which results in a mainly sealed cylindrical portion of the base element which can be technically sealed by over molding.

The object of the invention is also particularly achieved by a vehicle comprising a door or hood and a car body and a device preferably based on one of the preceding devices.

The object of the invention is also particularly achieved by a use of a device preferably based on one of the preceding devices for a vehicle door or hood.

The object of the invention is also particularly achieved by a method for manufacturing an adjustable stopper device for a vehicle door or hood, comprising
- forming a base part by injection molding, thereby forming a thread of the base part,
- forming an adjustment part by injection molding, thereby forming a thread of the adjustment part, forming a stopper part by injection molding,
building a fastening structure for fastening the base part to the car body.

Further methods according to the invention are described in the following.

In a further aspect, a second method preferably based on foregoing method, a sealing element for sealing against the car body around one or more openings of the car body, which opening or openings are used to fasten the base part to the car body, is overmolded, preferably by a two-component injection molding, onto the base part.

In a further aspect, a third method preferably based on one of the foregoing methods, a sealing closure of a distal end of a first cylindrical portion in the base part is molded in the same step, in which the base part is molded, and out of the same material, whereby the first cylindrical portion being coaxially positioned with the base part's thread and whereby the distal end of said first cylindrical portion being the end at the far side with respect to the position of the adjustment part and/or the stopper part.

In a further aspect, a fourth method preferably based on the second method, a sealing cover is molded onto a distal end of a first cylindrical portion in the base part in the same step, in which the sealing element is molded, and out of the same material, whereby the first cylindrical portion being coaxially positioned with the base part's thread and whereby the distal end of said first cylindrical portion being the end at the far side with respect to the position of the adjustment part and/or the stopper part.

In a further aspect, a fifth method preferably based on one of the foregoing methods, wherein the fastening structure is fixed to the base part
by molding the fastening structure at least partially with the base part, when the base part is formed, and/or
by attaching, preferably clipping, the fastening structure or parts of the fastening structure to the preformed base part.

BRIEF DESCRIPTION OF THE DRAWINGS

Embodiments of the present invention will now be described—by way of example only—with reference to the accompanying drawings, whereby FIG. 2*a*-2*k* show an adjustable stopper device according to the invention based on an adjustable stopper shown in FIG. 1, wherein FIG. 2*a* is a perspective view from below, FIG. 2*b* a rear view, FIG. 2*c* a side view, FIG. 2*d* a front view, FIG. 2*e* a top view, FIG. 2*f* a perspective view from above, FIG. 2*g* top view to denote a cross-section shown in FIGS. 2*h* and 2*i* for depicting the insertion of the device into openings of the car body, FIG. 2*j*-2*k* a perspective view of the base part and adjustment with stopper part respectively, FIG. 3*a*-3*g* show and adjustable stopper device according to the invention based on an adjustable stopper shown in FIG. 1, wherein FIG. 3*a* is a perspective view from below, FIG. 3*b* a bottom view, FIG. 3*c* a rear view, FIG. 3*d* a side view, FIG. 3*e* a front view, FIG. 3*f* a top view and FIG. 3*g* a perspective view from above, FIG. 4*a*-4*l* show an adjustable stopper device according to the invention based on an adjustable stopper device shown in FIG. 1, wherein FIG. 4*a* is a perspective view of the assembled device from below, FIG. 4*b* a perspective explosion view from below, FIG. 4*c*-4*e* top, side and bottom view of the adjustment part, FIG. 4*f*-*h* side, top and a cross-sectional side view of the stopper part 300, FIG. 4*i*-*l* top, cross-sectional side, side and bottom view of the base part 100.

FIG. 5*a*-5*ai* show and adjustable stopper device according to the invention based on an adjustable stopper shown in FIG. 4*a*-*l*, wherein FIG. 5*a* is an explosion side view, FIG. 5*b* is an perspective explosion view from below, FIG. 5*c*-*l* views of the assembled device, FIG. 5*c* a bottom view without sealing element 500 and sealing cover 800, FIG. 5*d* a perspective view without sealing element 500 and sealing cover 800, FIG. 5*e*-*l* views with sealing element 500 and sealing cover 800, FIG. 5*e* a bottom view, FIG. 5*f* a side view, FIG. 5*g* a further side view at different angle, FIG. 5*h* a further side view at different angle, FIG. 5*i* a top view, FIG. 5*j*-5*p* views of the adjustment part 200, FIG. 5*j* a bottom view, FIG. 5*k* a side view, FIG. 5*l* a further side view at different angle, FIG. 5*m* further side view at different angle, FIG. 5*n* a perspective view from above, FIG. 5*o* a top view, FIG. 5*p* a perspective side view, FIG. 5*q*-5*w* views of the base part, FIG. 5*q*-5*t* with sealing element 500 and sealing cover 800, FIG. 5*q* a bottom view, FIG. 5*r* a side view, FIG. 5*s* a further side view at different angle, FIG. 5*t* a further side view at different angle, FIG. 5*u*-*w* without sealing element 500 and sealing cover 800, FIG. 5*u* a perspective view from below, FIG. 5*v* a top view, FIG. 5*w* a further perspective view from below, FIG. 5*x*-5*ad* views of the coupling part, FIG. 5*x* a top view, FIG. 5*y*-5*aa* side views at different angles, FIG. 5*ab* and FIG. 5*ad* perspective views from below, FIG. 5*ac* a bottom view, FIG. 5*ae*-*ai* views of the stopper part, FIG. 5*ae* a bottom view, FIG. 5*af*-*ah* side views at different angles, FIG. 5*ai* a top view.

DETAILED DESCRIPTION

Figure 1:
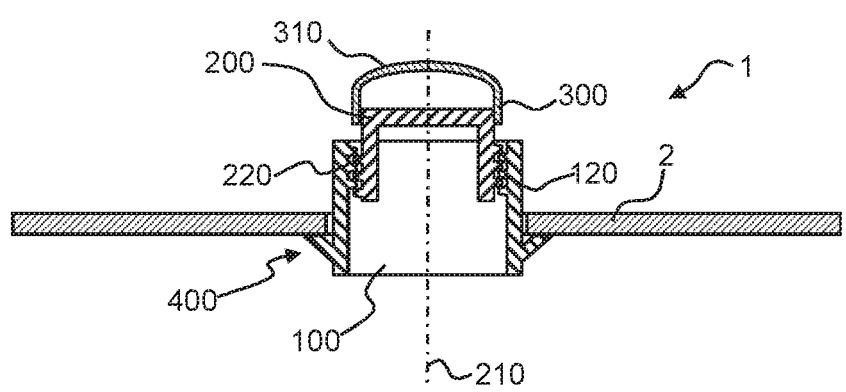
FIG. 1 shows a cut through an adjustable stopper device similar to the one shown in the cited art.

The Adjustable stopper device 1 for a vehicle door or hood shown in FIG. 1 comprises: a base part 100; an adjustment part 200, wherein the adjustment part 200 is connected to the base part 100 via threads 120, 220 and thereby rotatable around a device axis 210 with respect to the base part 100; a stopper part 300 configured to contact the vehicle door and to provide an abutment surface 310 for the vehicle door when the vehicle door is closed, wherein the stopper part 300 is connected to the adjustment part 200 and wherein the axial position of the abutment surface 310 is adjustable by turning the adjustment part 200 with respect to the base part 100 around the device axis 210; a fastening structure 400 for fastening the base part 100 to the car body 2.

The device 1 shown in the following figures are based on the device shown in FIG. 1 and comprise a sealing element 500 for sealing against the car body 2 which is surrounding the fastening structure 400. The sealing element 500 is made of plastic and formed adhesively onto the base part 100 by an injection molding step. The base part 100 is made of a different plastic and in a different injection molding step than the sealing element 500, wherein the plastic of the sealing element 500 is softer than the plastic of the base part 100. The stopper part comprises a central opening 320 into which a tool can be inserted for engagement with the adjustment part 200, in order to rotate the adjustment part 200. The thread 120 of the base part 100 is an inner thread and the thread 220 of the adjustment part 200 is an outer thread. The adjustment part 200 is formed as a pin, which can be screwed into the base part 100. The stopper part 300 is formed as a cap or dome, and built of softer material than the adjustment part 200 and base part 100.

Figure 2A:
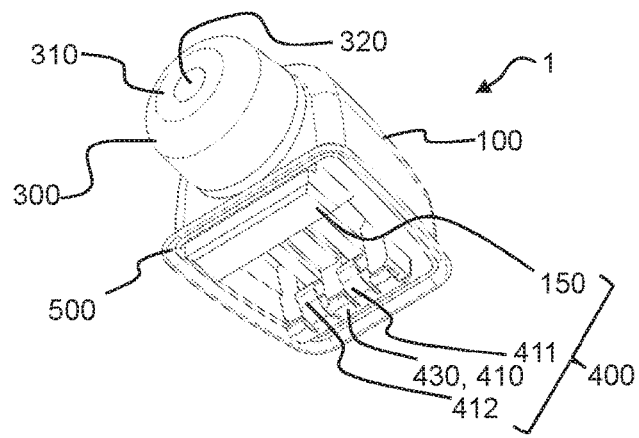
Figure 2B:
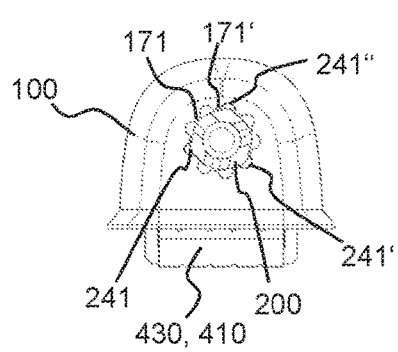
Figure 2C:
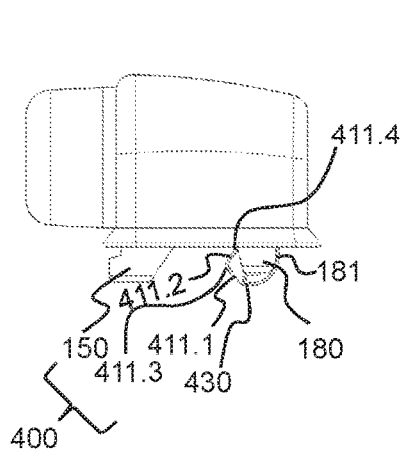
Figure 2D:
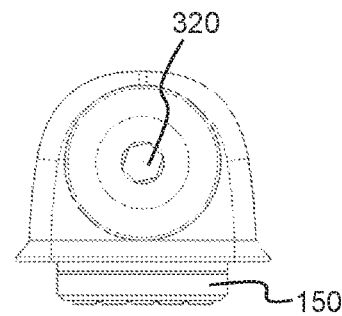
Figure 2E:
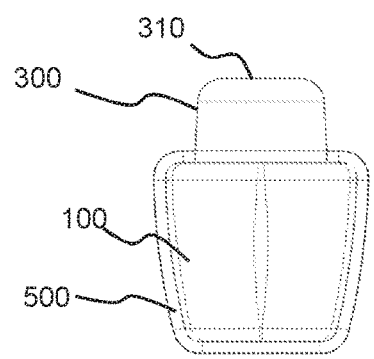
Figure 2F:
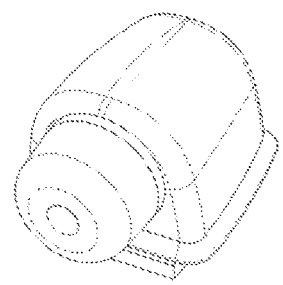
Figure 2G:
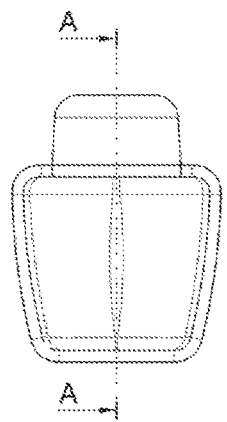
Figure 2H:
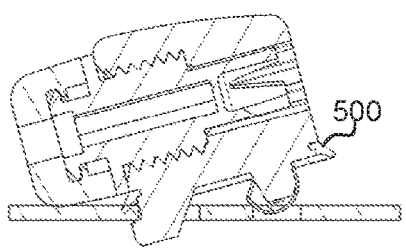
Figure 2I:
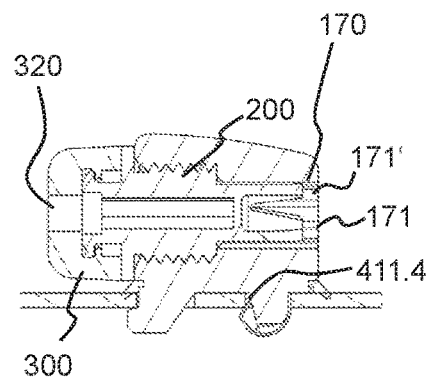
Figure 2J:
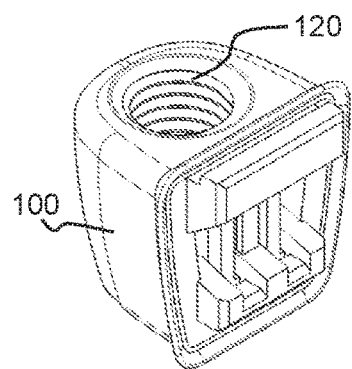
Figure 2K:
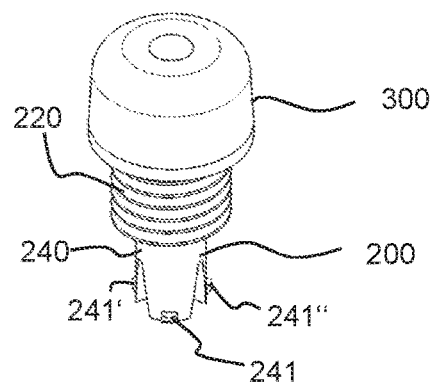
Figure 3A:
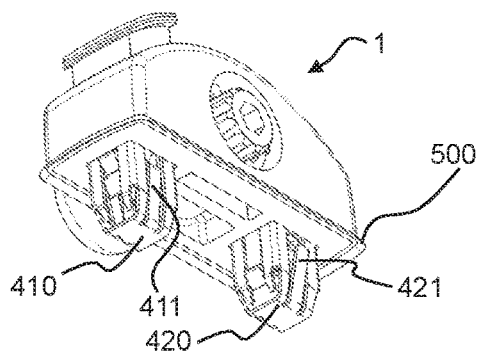
Figure 3B:
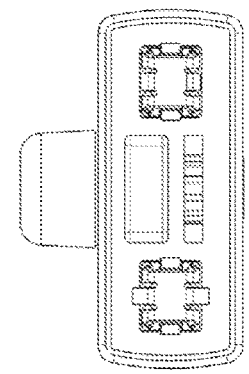
Figure 3C:
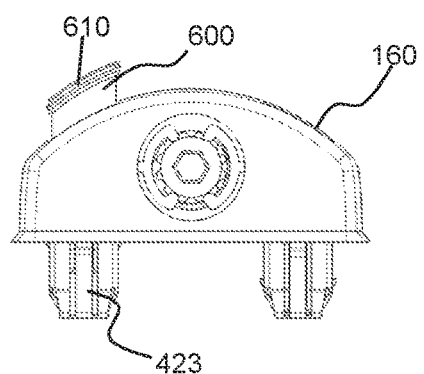
Figure 3D:
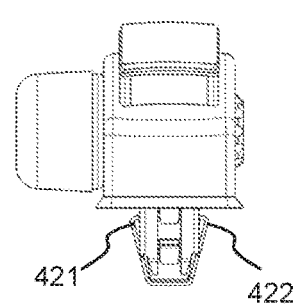
Figure 3E:
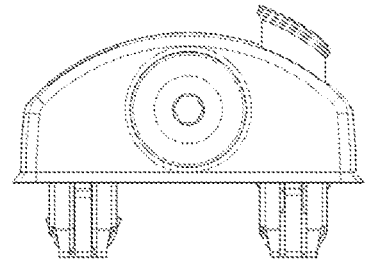
Figure 3F:
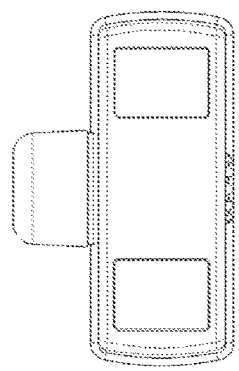
Figure 3G:
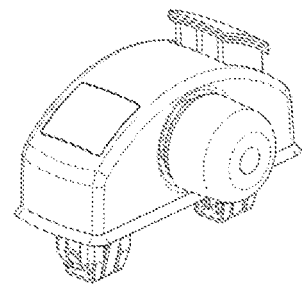
Figure 4A:
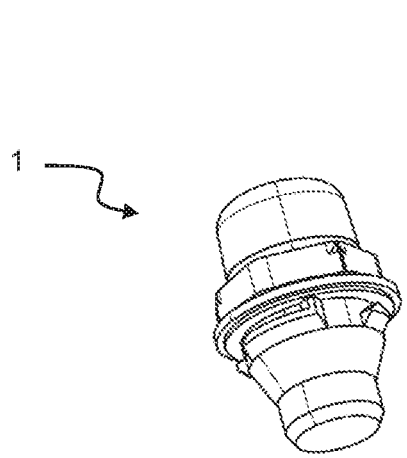
Figure 4B:
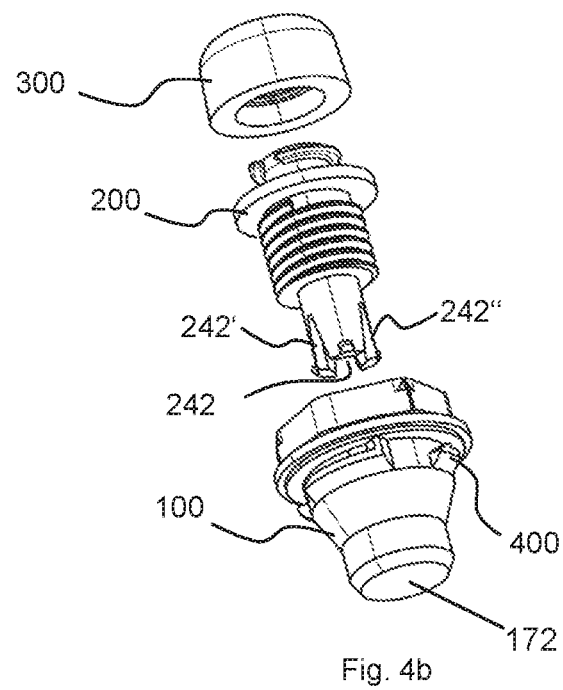
Figure 4C:
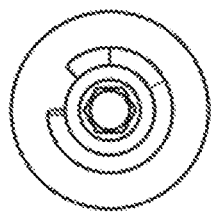
Figure 4D:
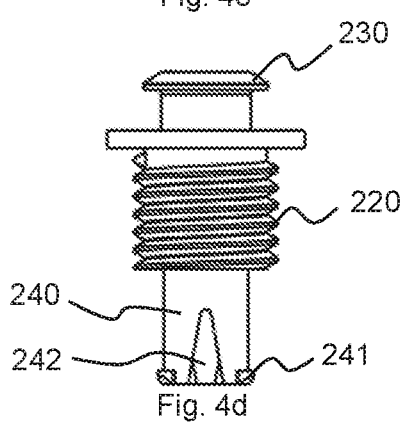
Figure 4F:
Figure 4H:
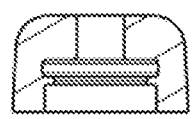
Figure 4G:
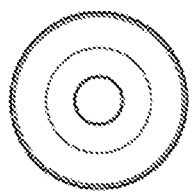
Figure 4E:
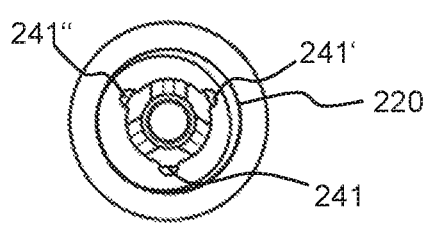

The device shown in FIG. 2*a*-2*k* has a fastening structure with three expansion and/or hook elements 411, 412, 150. The element 150 is only a hook element, whereas the elements 411 and 412 are expansion and hook elements. A subset of the three expansion and/or hook elements, i.e. the expansion and hook elements 411 and 412, is configured to be brought into a fastening position with respect to a corresponding opening or corresponding openings of the car body 2. When the subset is introduced into the opening or openings and is in the fastening position, the base part 100 is fastened to the car body 2. The subset is configured to be brought back, when the base part 100 is fastened to the car body 2, into a release position with respect to the opening or openings of the car body 2, wherein with the subset or the entirety being in the release position, the base part 100 can be removed from the car body 2, in this case pulled out. The expansion and/or hook elements 411, 412 preferably comprise one or more flexible portion, which allows the expansion and/or hook element to move between fastening position and release position. The device 1 is of the type which is mounted from a substantially different direction than the direction from which the door impinges on the mounted device 1, such that a central axis 3 of the opening or openings of the car body 2, which is perpendicular to the surrounding car body surface, and the device axis 210 define a substantial angle between themselves, when the device 1 is mounted to the car body 2, here 90°. The car body 2 comprises one or more openings, cf. FIGS. 2*h* and 2*i*, for one or more of the multiple expansion and/or hook elements 411, 412, 150, such that, when the device is fastened to the car body 2 the base part 100 is not rotatable with respect to the car body 2 due to a form fitted fastening. A subset of the one or more expansion and/or hook elements, i.e. the expansion and hook elements 411, 412, is made of metal wherein the base part 100 is made of plastic. Two of the expansion and/or hook elements 411, 412 are integrally formed within one component 410, whereby these two of the expansion and/or hook elements 411, 412 are grouped within that component 410, wherein the component 410 is attached to the base part 100. The subset 411, 412 is part of a clip component 430 which is clipped or clippable onto the base part 100. Hence, the component 410 is a clip component. The base part 100 comprises a tooth-like protrusion 180, wherein the clip component 430 is clipped or clippable onto the base part 100 by clipping the clip components 430 over the tooth-like protrusion 180. At least a portion of the clip component 430 covers a side wall 181 of the tooth-like protrusion 180, here a side wall on the far side with respect to the stopper part 300, such that in the fastened state of the device 1, said portion of the clip component 430 is located in between the side wall 181 of the tooth-like protrusion 180 and the rim of the opening of the car body 2 such that the clip component 430 protects the tooth-like protrusion 180 from being damaged by the rim of the opening of the car body 2. As can be seen in FIG. 2*g*-2*i*, the subset of the one or more expansion and/or hook elements, i.e. 411, 412, is configured to be brought into the fastening position by at first introducing a side of the device 1 opposite to the subset into the corresponding opening until a portion of that side abuts on or next to the rim of the opening and then pivoting the device 1 and the base part 100 around that abutted portion, such that by the pivoting, the subset reaches the fastening position in which the expansion and/or hook elements 411, 412 engage behind a rim of the opening or openings. The device 1, here the base part 100, comprises as one of the expansion and/or hook elements 411, 412, 150 a rigid hook element 150 at one side which is configured to engage behind the corresponding opening in the car body 2, and the other expansion and hook elements 411, 412 are located at an opposing side. The hook element 150 is integrally formed on the base part 100 out of the same material as the base part 100. The one side is a side neigh-boring the stopper part 300, and the opposing side is a far side with respect to the stopper part 300. The hook element 150 is configured to engage behind the corresponding opening in the car body 2 before or when the expansion and hook elements 411, 412 reach the fastening position in which they engage behind a rim of the opening or openings. The subset 411, 412 comprise a distal portion 411.1 having a first inclination with respect to the insertion direction, a proximal portion 411.2 having second inclination opposite to the first inclination and in between an edge 411.3, such that by pulling on the device 1 when its fastened to the car body 2 in a direction opposite to the insertion direction, the subset or the entirety are brought into the release position and further pulling allows to remove the device 1 from the car body 2. The first inclination is lower than the second inclination such that a pull-out force is higher than an insertion force of the device 1. The proximal end point 411.4 of the proximal portion 411.2 having the second inclination, is either radially fixed with respect to the device 1 or, in the state of the device 1 being mounted, within or before—seen from the insertion side—the opening of the car body 2.27. The device 1 comprises a rotation snap mechanism, which snaps into distinct rotational angle positions, which comprises a first cylindrical portion 170 in the base part 100, coaxially positioned with the base part's 100 thread 120, wherein the inner wall of the first cylindrical portion 170 comprises radially inwards protruding teeth or rips or knobs 171. The snap mechanism further comprises a second cylindrical portion 240 of the adjustment part 200, positioned coaxially with the adjustment part's 200 thread 220, wherein the outer wall of the second cylindrical portion 240 comprises radially outwards protruding, resilient teeth or rips or knobs 241, which are configured to engage with the axially extending teeth or rips or knobs 171 and thereby provide a predefined, resistance to a rotation moment which can be overcome by a predefined threshold moment resulting in a repeated deflection and relaxation of the teeth or rips or knobs 241 of the adjustment part 200 radially inwards and outwards while the adjustment part 200 is being turned around the device axis 210. The resilient teeth or rips or knobs 241 are resilient by axial cut outs 242 of the cylindrical portion. The teeth or rips or knobs 241 are rounded or slanted with respect to tangential direction, hence such that a rotation movement is facilitated, while still generating a moment against rotation due to the deflection of some or all of the teeth or rips or knobs 241. The circumscribed circle of the teeth or rips or knobs 241 of the second cylindrical portion 240 is smaller than the circumscribed circle of the thread 220 of the adjustment part (can be especially be seen in FIG. 4*e*). The incircle described by the teeth or rips or knobs 171 of the first cylindrical portion 170 is smaller than the incircle described by the thread 120 of the base part. The threaded portions of base part 100 and adjustment part 200 are distinct and neighboring portions (i.e., axially non overlapping) with respect to the cylindrical portions 170, 240.

The device 1 shown in FIG. 3*a*-*g* has especially following differences with respect to the one shown in FIG. 2*a*-2*l*, otherwise has similar or the same features as the one in FIG. 2*a*-2*k*. For example, the device 1 has a similar rotation snap mechanism, while alternatively and preferably, the device 1 could have the same rotation snap mechanism as the device 1 of FIG. 2a-k with resilient teeth or ribs or knobs protruding outward on the inner part (i.e. the second cylindrical portion 240). The fastening structure 400 comprises four expansion and/or hook elements 411, 412, 421, 422. The entirety of the four expansion and/or hook elements, hence the elements 411, 412, 421, 422, is configured to be brought into a fastening position with respect to a corresponding opening or corresponding openings of the car body 2, wherein, when the entirety is introduced into the opening or openings and is in the fastening position, the base part 100 is fastened to the car body 2. The entirety is configured to be brought back, when the base part 100 is fastened to the car body 2, into a release position with respect to the opening or openings of the car body 2, wherein with the entirety being in the release position, the base part 100 can be removed from the car body 2, here pulled out. Four of the expansion and/or hook elements 411, 412, 421, 422 are integrally formed within two components 410, 420, whereby two of the expansion and/or hook elements 411, 412, 421, 422 are grouped within one component 410, 420, wherein the two components 410, 420 are partly seated and fixed within the base part 100. The two components 410, 420 are surrounding the device axis 210 and the threads 120, 220.20. The expansion and/or hook elements 411, 412, 421, 422 are positioned next to a hollow expansion area 423. The device 1 comprises one or more bolt elements 600 insertable into the respective expansion area 423 through a bolt opening or bolt openings in the base part 100. The one or more expansion and/or hook elements 411, 412, 421, 422 are configured to rest in the release position when the bolt element 600 is not inserted into the respective expansion area 423 and are configured to be maintained in the fastening position when the bolt element 600 is inserted in the respective expansion area 423. The bolt element 600 comprises a bolt sealing element 610 configured to seal around the bolt element 600 and the bolt opening or openings in the base part 100. The bolt sealing element 610 is formed onto the bolt 600 by a 2-component injection molding process.

The device 1 shown in FIG. 4a-e shows a design of the type, which is mounted from a substantially same direction as the direction from which the door impinges on the mounted device 1. The fastening structure 400 on the back part comprises radial protrusions which engage behind the opening of the car body after the base part 100 is inserted into the whole and rotated around the device axis by a predetermined angel. The device 1 has the same rotation sap mechanism as the one of the device 1 shown in FIG. 2a-k. In addition, the distal end of the first cylindrical portion 170, which is the end at the far side with respect to the position of the adjustment part 200 and stopper part 300, is closed off by the base part's 100 material. The material forms a sealing closure 172 of the distal end of a first cylindrical portion 170 in the base part 100 which is molded in the same step, in which the base part 100 is molded, and out of the same material. The stopper part 300 is connected by a snap fit to the adjustment part 200.

Figures 5A, 5B:
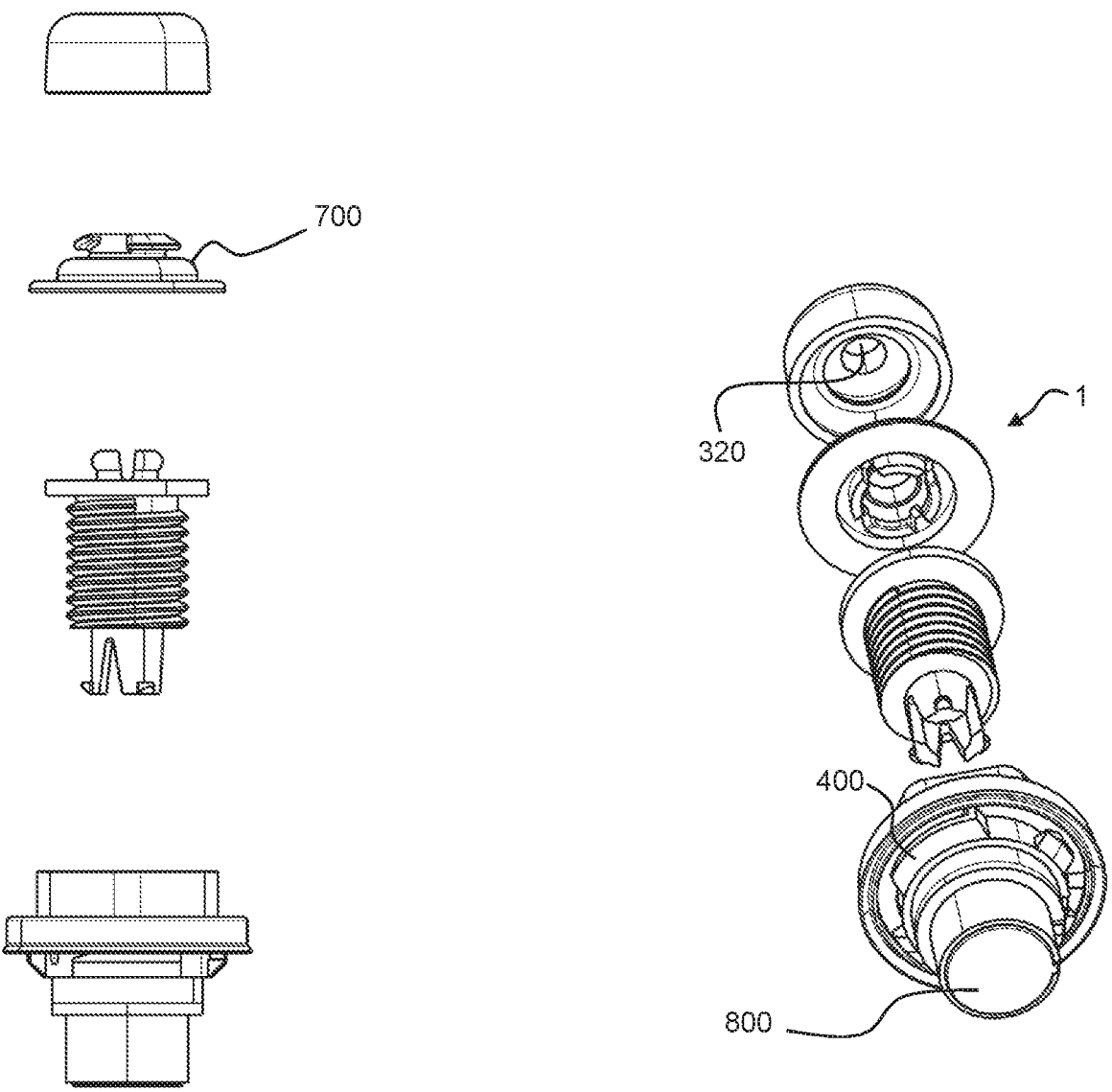
Figure 5C:
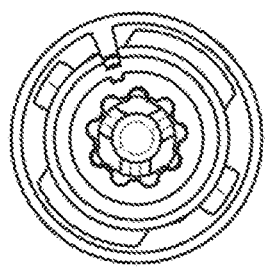
Figure 5D:
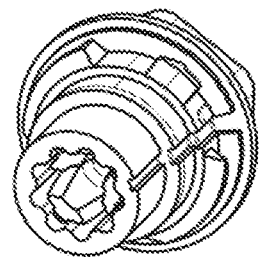
Figure 5E:
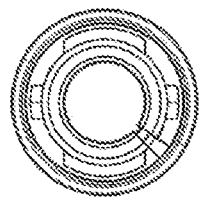
Figure 5F:
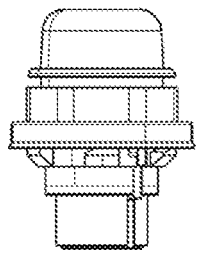
Figure 5G:
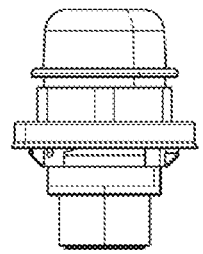
Figure 5H:
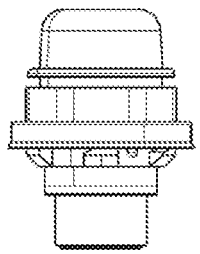
Figure 5I:
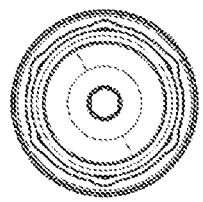
Figure 5J:
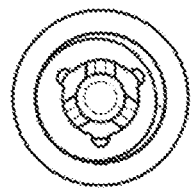
Figure 5K:
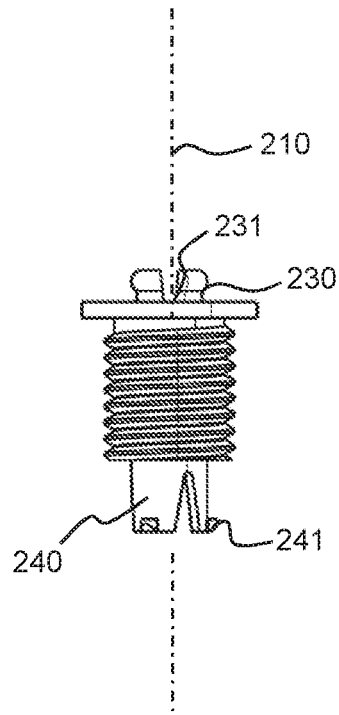
Figure 5L:
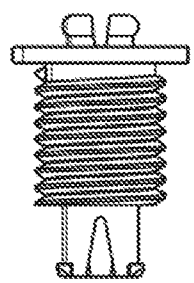
Figure 5M:
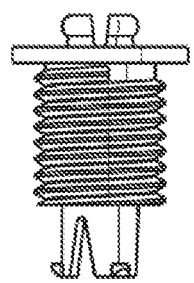
Figure 5N:
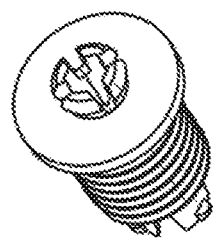
Figure 5O:
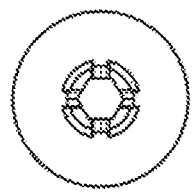
Figure 5P:
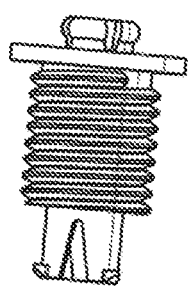
Figure 5Q:
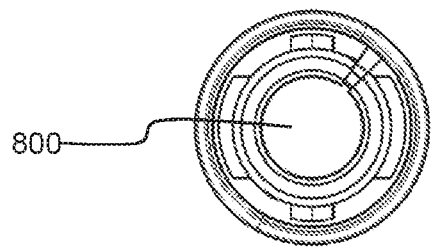
Figure 5R:
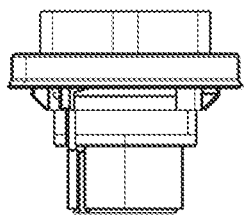
Figure 5S:
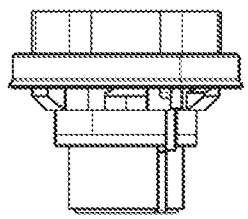
Figure 5T:
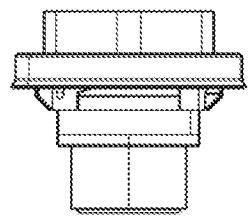
Figure 5U:
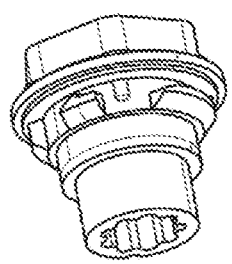
Figure 5V:
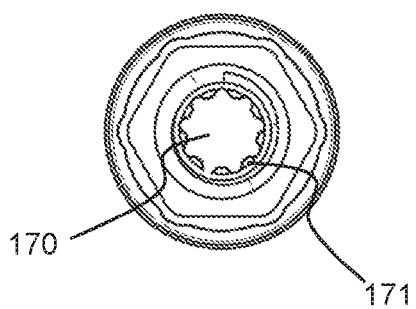
Figure 5W:
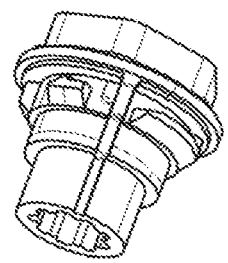
Figure 5X:
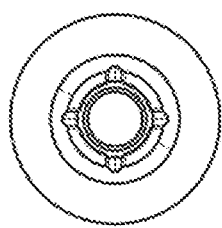
Figure 5Y:
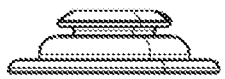
Figure 5Z:
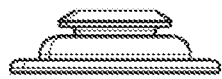
Figure 5A:
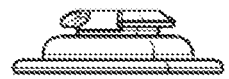
Figure 5A:
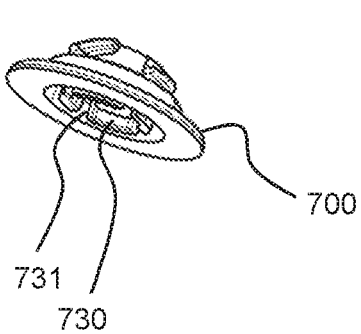
Figure 5A:
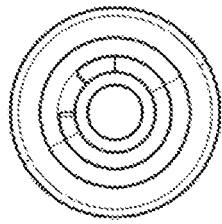
Figure 5A:
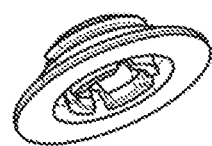

The device shown in FIG. 5a-ai in addition comprises a coupling part (700), which is coupling the stopper part (300) to the adjustment part (200), wherein, unlike the device shown in FIG. 4a-e, the stopper part 300 is connected by a snap fit to the coupling part 700, and the coupling part 700 is connected to the adjustment part 200. The connection between the adjustment part 200 and the coupling part 700 is formed as a rotational joint, rotating around the device axis 210. The connection between the adjustment part 200 and the coupling part 700, which is formed as the rotational joint, is a snap fit connection between the coupling part 700 and the adjustment part 200, comprising a circular pin 230 having a distal end portion with a bigger diameter than a smaller diameter of a proximal portion, whereby at the proximal portion, the pin 230 is fixed to the adjustment part 200 by being integrally formed with the adjustment part 200;

and a respective circular opening 730 with a bigger diameter, which is corresponding to the bigger diameter of the pin 230 and located axially further inside the opening, and a smaller diameter, which is corresponding to the smaller diameter of the pin 23 and located axially closer to the rim of the circular opening 730, whereby the circular opening 730 is formed within the coupling part 700. The circular pin 230 is resilient to a predetermined extent. The circular pin 230 is squishable via one or more axial cut outs 231. The circular opening 730 is extendable via one or more axial cut outs 731. The stopper part 300 is made of a softer material than the coupling part 700. The stopper part 300 and the coupling part 700 comprise two openings 320, 730, which are coaxially aligned to each other, such that the adjustment element 200 is configured to be rotated by a tool which is introduced into these openings coming from the abutment surface 310. Unlike the device shown in FIG. 4a-e, the distal end of the first cylindrical portion 170, which is the end at the far side with respect to the position of the adjustment part 200 and stopper part 300, is covered by a sealing cover 800, formed onto the base part 100 by a two-component injection molding process, preferably within the same injection molding step as the sealing element 500.

| Reference skins | |
|---|---|
| 1 | adjustable stopper device |
| 2 | car body |
| 3 | central axis of the opening or openings of the car body |
| 100 | base part |
| 120 | thread |
| 150 | hook element |
| 160 | bolt opening |
| 170 | first cylindrical portion |
| 171 | tooth or rip or knob |
| 172 | sealing closure |
| 180 | tooth-like protrusion |
| 181 | side wall |
| 200 | adjustment part |
| 210 | device axis |
| 220 | thread |
| 230 | pin |
| 231 | axial cut out |
| 240 | second cylindrical portion |
| 241 | tooth or rip or knob |
| 242 | axial cut out |
| 300 | stopper part |
| 310 | abutment surface |
| 320 | opening |
| 400 | fastening structure |
| 410 | first component |
| 411, 412 | expansion and/or hook element |
| 411.1 | distal portion |
| 411.2 | proximal portion |
| 411.3 | edge |
| 411.4 | proximal end point |
| 413 | hollow expansion area |
| 420 | second component |
| 421, 422 | expansion and/or hook element |

-continued

| Reference skins | |
|---|---|
| 423 | hollow expansion area |
| 430 | Clip component |
| 500 | sealing element |
| 600 | bolt element |
| 700 | coupling part |
| 730 | circular opening |
| 731 | axial cut out |
| 800 | sealing cover |

The invention claimed is:

1. Adjustable stopper device (1) for a vehicle door or hood, comprising:
a base part (100),
an adjustment part (200), wherein the adjustment part (200) is connected to the base part (100) via threads (120, 220) and thereby rotatable around a device axis (210) with respect to the base part (100),
a stopper part (300) configured to contact the vehicle door and to provide an abutment surface (310) for the vehicle door when the vehicle door is closed, wherein the stopper part (300) is connected to the adjustment part (200) and wherein the axial position of the abutment surface (310) is adjustable by turning the adjustment part (200) with respect to the base part (100) around the device axis (210),
a fastening structure (400) for fastening the base part (100) to the car body (2);
a rotation snap mechanism, which snaps into distinct rotational angle positions, which comprises:
a first cylindrical portion (170) in the base part (100), coaxially positioned with the thread (120) of the base part (100), wherein the inner wall of the first cylindrical portion (170) comprises one or more radially inwards protruding teeth or rips or knobs (171), and
a second cylindrical portion (240) of the adjustment part (200), positioned coaxially with the thread (220) of the adjustment part (200), wherein the outer wall of the second cylindrical portion (240) comprises one or more radially outwards protruding, resilient teeth or rips or knobs (241) which is or are configured to engage with the axially extending teeth or rips or knobs (171) and thereby provide a predefined, resistance to a rotation moment which can be overcome by a predefined threshold moment resulting in a repeated deflection and relaxation of the one or more teeth or rips or knobs (241) of the adjustment part (200) radially inwards and outwards while the adjustment part (200) is being turned around the device axis (210);
wherein the distal end of the first cylindrical portion (170), which is the end at the far side with respect to the position of the adjustment part (200) and/or stopper part (300), is:
closed off by the base part's (100) material, or
covered by a sealing cover (800), formed onto the base part (100) by a two-component injection molding.

2. Device according to claim 1, wherein the device (1) comprises a sealing element (500) for sealing against the car body (2) which is surrounding the fastening structure (400), wherein the sealing element (500) is made of plastic and formed adhesively onto the base part (100) by an injection molding step that includes the two-component injection molding.

3. Vehicle comprising a door or hood and a car body (2) and a device (1) according to claim 1.

4. A method of using a device (1) according to claim 1, the method comprising connecting the device to a door or hood or car body of a vehicle.

5. A method for manufacturing an adjustable stopper device (1) for a vehicle door or hood, comprising
forming a base part (100) by injection molding, thereby forming a thread (120) of the base part (100),
forming an adjustment part (200) by injection molding, thereby forming a thread (220) of the adjustment part (200),
forming a stopper part (300) by injection molding,
building a fastening structure (400) for fastening the base part (100) to the car body;
wherein a sealing closure (172) of a distal end of a first cylindrical portion (170) in the base part (100) is molded in the same step, in which the base part (100) is molded, and out of the same material, wherein the first cylindrical portion (170) is coaxially positioned with the thread (120) of the base part (100) and wherein the distal end of said first cylindrical portion (170) is the end at the far side with respect to the position of the adjustment part (200) and/or the stopper part (300).

6. A method according to claim 5, wherein a sealing element (500) for sealing against the car body (2) around one or more openings of the car body (2), which opening or openings are used to fasten the base part (100) to the car body (2), is overmolded, by a two-component injection molding, onto the base part (100).

7. A method for manufacturing an adjustable stopper device (1) for a vehicle door or hood, comprising
forming a base part (100) by injection molding, thereby forming a thread (120) of the base part (100),
forming an adjustment part (200) by injection molding, thereby forming a thread (220) of the adjustment part (200),
forming a stopper part (300) by injection molding
building a fastening structure (400) for fastening the base part (100) to the car body;
wherein a sealing element (500) for sealing against the car body (2) around one or more openings of the car body (2), which opening or openings are used to fasten the base part (100) to the car body (2), is overmolded by a two-component injection molding, onto the base part (100);
wherein a sealing cover (800) is molded onto a distal end of a first cylindrical portion (170) in the base part (100) in the same step, in which the sealing element (500) is molded, and out of the same material, wherein the first cylindrical portion (170) is coaxially positioned with the thread (120) of the base part and wherein the distal end of said first cylindrical portion (170) is the end at the far side with respect to the position of the adjustment part (200) and/or the stopper part (300).

8. A method according to claim 7, wherein the fastening structure (400) is fixed to the base part (100)
by molding the fastening structure (400) at least partially with the base part (100), when the base part (100) is formed, and/or
by attaching, preferably clipping, the fastening structure (400) or parts of the fastening structure (400) to the preformed base part (100).

* * * * *